United States Patent
Zama et al.

(10) Patent No.: US 9,085,467 B2
(45) Date of Patent: *Jul. 21, 2015

(54) PROCESS FOR THE PREPARATION OF TITANIUM DIOXIDE HAVING NANOMETRIC DIMENSIONS AND CONTROLLED SHAPE

(75) Inventors: Isabella Zama, Faenza (IT); Francesco Matteucci, Ravenna (IT); Christian Martelli, Faenza (IT); Giuseppe Ciccarella, Lecce (IT)

(73) Assignee: DAUNIA SOLAR CELL S.R.L., Foggia (IT)

(*) Notice: Subject to any disclaimer, the term of this patent is extended or adjusted under 35 U.S.C. 154(b) by 644 days.

This patent is subject to a terminal disclaimer.

(21) Appl. No.: 13/383,534

(22) PCT Filed: Jul. 15, 2010

(86) PCT No.: PCT/EP2010/004316
§ 371 (c)(1),
(2), (4) Date: Mar. 22, 2012

(87) PCT Pub. No.: WO2011/006659
PCT Pub. Date: Jan. 20, 2011

(65) Prior Publication Data
US 2012/0171113 A1    Jul. 5, 2012

(30) Foreign Application Priority Data
Jul. 16, 2009   (IT) .......................... MI2009A001269

(51) Int. Cl.
*C01G 23/053*   (2006.01)
*C01G 23/047*   (2006.01)
(Continued)

(52) U.S. Cl.
CPC .............. *C01G 23/047* (2013.01); *B82Y 30/00* (2013.01); *C25B 1/003* (2013.01); *C01P 2002/72* (2013.01); *C01P 2002/88* (2013.01);
(Continued)

(58) Field of Classification Search
CPC ...... B82Y 30/00; B82Y 40/00; C01G 23/047; C01G 23/053
USPC ........................ 252/500, 520.2, 582; 423/598, 423/610–616; 502/350; 516/90; 977/762, 977/773; 427/212
See application file for complete search history.

(56) References Cited

U.S. PATENT DOCUMENTS
2006/0104894 A1* 5/2006 Daoud et al. .................. 423/610

FOREIGN PATENT DOCUMENTS
WO    2009/101640    8/2009

OTHER PUBLICATIONS
Parra et al, "Reaction pathway to the systhesis of anatase via chemical modification of Titanium Isopropoxide with acetic acid," Chem. Mater, 2008m 20, 143-150.*
(Continued)

*Primary Examiner* — Colleen Dunn
(74) *Attorney, Agent, or Firm* — Lucas & Mercanti, LLP

(57) ABSTRACT

The present invention relates to a process for the preparation of materials with nanometric dimensions and controlled shape, based on titanium dioxide. The invention also relates to a process for the preparation of titanium dioxide nanorods and nanocubes with anatase phase composition, which are highly suitable for photocatalytic use, in particular for applications involving photovoltaic cells, for example Dye Sensitized Solar Cells (DSSC), photoelectrolysis cells and tandem cells for the conversion of solar energy and the production of hydrogen.

11 Claims, 8 Drawing Sheets

(51) Int. Cl.
*B82Y 30/00* (2011.01)
*C25B 1/00* (2006.01)

(52) U.S. Cl.
CPC ........ *C01P 2004/04* (2013.01); *C01P 2004/13* (2013.01); *C01P 2004/54* (2013.01); *C01P 2006/12* (2013.01); *C01P 2006/64* (2013.01)

(56) References Cited

OTHER PUBLICATIONS

Lei Miao, et al., Fabrication Characterization and Raman Study of Anatase-TiO2 . . . , Journal of Crystal Growth, Elsevier, Amsterdam, NL, vol. 264, No. 1-3, pp. 246-252, 2004.*

Yanfeng Gao, et al., Surfactant-Free Synthesis of Anatase TiO2 Nanorods . . . Crystal Growth & Design vol. 8, No. 6, 2008, pp. 1804-1807, XP002560254.*

Zhong et al, "Synthesis of One-Dimensional and Porous TiO2 Nanostructures by Controlled Hydrolysis of Titanium Alkoxide via Coupling with an Esterification Reaction," Chem. Mater. 2005, 17, 6814-6818.*

Yanfeng Gao, et al., Surfactant-Free Synthesis of Anatase TiO2 Nanorods . . . , Crystal Growth & Design, vol. 8, No. 6, 2008, pp. 1804-1807, XP002560254.

Ryuhei Yoshida, et al., Syntheses of TiO2(B) Nanowires and TiO2 . . . , Journal of Solid State Chemistry, vol. 178, No. 7, 2005, pp. 2179-2185, XP004972248.

Zhihua Zhang, et al., Aminolysis Route to Monodisperse Titania . . . , Angewandte Chemie, vol. 44, No. 22, 2005, pp. 3466-3470, XP001235083.

* cited by examiner

US 9,085,467 B2

PROCESS FOR THE PREPARATION OF TITANIUM DIOXIDE HAVING NANOMETRIC DIMENSIONS AND CONTROLLED SHAPE

CROSS-REFERENCE TO RELATED APPLICATIONS

This application is a 371 of PCT/EP2010/004316 filed on Jul. 15, 2010, which claims the benefit of Italian Patent Application No. MI2009A 001269 filed on Jul. 16, 2009, the contents of each of which are incorporated herein by reference.

FIELD OF THE INVENTION

The present invention relates to an industrial applicable process for the preparation of materials with nanometric dimensions and controlled shape, based on titanium dioxide. The invention also relates to a process for the preparation of titanium dioxide nanorods and nanocubes with anatase phase composition, which are highly suitable for applications involving photovoltaic cells, particularly Dye Sensitized Solar Cells (DSSC), photoelectrolysis cells and tandem cells for the conversion of solar energy and the production of hydrogen.

BACKGROUND OF THE INVENTION

Titanium dioxide ($TiO_2$) is one of the most important metal oxides in industrial applications, since it is used in an array of different sectors, ranging from paper production to pharmaceuticals, cosmetics, photocatalysts, photovoltaic cells, photoelectric cells, sensors, inks, coatings, coverings and plastic, and even encompassing the photocatalysis of organic pollutants. In particular, certain types of $TiO_2$ are especially suitable for applications involving photovoltaic cells, particularly Dye Sensitized Solar Cells (DSSC), photoelectrolysis cells and tandem cells for the conversion of solar energy and the production of hydrogen.

$TiO_2$ has various crystalline shapes. The most common crystalline phases of $TiO_2$, anatase, rutile and brookite, exhibit different chemical/physical properties, such as stability field, refraction indexes, chemical reactivities and behaviour to irradiation with electromagnetic radiation. The use and performance of $TiO_2$ depends greatly on its crystalline phase, on its morphology and on the dimensions of the particles, as reported, for instance, by X. Chen and S. S. Mao in J. Nanosci. Nanotechnol, 6(4), 906-925, 2006. The phase composition, the shape of the crystals and the dimensions of the particles exert an enormous influence over the chemical/physical, mechanical, electronic, magnetic and optical properties of the end product.

In terms of their dimensions, particles with nanometric dimensions have electrical, thermal, magnetic and optical properties that differ from those of larger particles. $TiO_2$ particles with nanometric dimensions, particularly those with a diameter of between 1 and 20 nanometers, have properties similar to those of molecules, in that they exhibit effects of quantisation and unusual luminescence (X. Chen and S. S. Mao, Chem. Rev., 107, 2891-2959, 2007).

Anatase-phase crystalline $TiO_2$ is an oxide that is widely used as a photocatalyst, as a white pigment for coatings and cosmetic products, and in various types of sensors.

The most recent, and most important, uses of anatase $TiO_2$ with nanometric dimensions concern applications involving photovoltaic cells, particularly DSSC, photoelectrolysis cells and tandem cells for the conversion of solar energy and the production of hydrogen.

A method to produce nanomaterials based on $TiO_2$ has been described by X. Chen e S. S. Mao, J. Nanosci. Nanotechnol, 6(4), 906-925, 2006). Further research has been performed towards new processes capable to obtain $TiO_2$ with controlled shape and size, such products being highly desired from the point of view of a more reproducible, and more effective performance. Studies conducted on the application of $TiO_2$ in DSSC cells (X. Chen and S. S. Mao, Chem. Rev., 107, 2891-2959, 2007 and J. Nanosci. Nanotechnol, 6(4), 906-925, 2006), have demonstrated that the most preferred shape is $TiO_2$ nanorods; the efficacy of this shape is probably due to the high specific surface, as opposed to common rounded, e.g. spherical particles.

The main methods for producing $TiO_2$ nanorods for industrial use are:
a) hydrothermal synthesis;
b) solvothermal synthesis;
c) sol-gel synthesis.

Hydrothermal syntheses, method a), use aqueous solutions containing titanium tetrachloride, generally in the presence of acids, inorganic salts and surfactants, at temperatures of up to 160° C. (X. Feng et al., Angew. Chem. Int. Ed., 44, 5115-5118, 2005; S. Yang and L. Gao, Chem. Lett. 34, 964-5, 2005; ibid. 34, 972-3, 2005; ibid. 34, 1044-5, 2005). Preferably, it is the rutile phase that is obtained, making these methods unsuitable for the formation of anatase.

Solvothermal synthesis, method b), (C. S. Kim et al., J. Cryst. Growth, 257, 309-15, 2003) makes it possible to obtain nanosized rods with anatase phase composition. These reactions are conducted in autoclave, mostly under anhydrous conditions, at high temperatures of around 250° C., for long periods, using an aromatic solvent, such as toluene, and in the presence of an organic acid such as oleic acid, which also functions as a surfactant. The titanium/solvent/surfactant ratio of the reagents exerts a strong influence over the dimensions of the nanorods, making it a laborious process to reach the desired result. Moreover, the requirement for prolonged thermal treatment makes this method of synthesis an expensive option.

High-temperature reactions using benzyl alcohol as a solvent, and in the absence of acidity (A. P. Caricato et al., Appl. Surf. Sci. 253, 6471-6475, 2007), enable the production of particles that are mostly spherical under rather drastic reaction conditions.

Sol-gel synthesis, method c), involves the controlled hydrolysis of titanium alkoxide with water, in the presence of fatty organic acids, such as oleic acid, which serves as a surfactant and stabilising agent, and catalysts such as amine or quaternary ammonium salts (Cozzoli, P. D., Kornowski, A., Weller, H. J., J. Am. Chem. Soc., 125, 14539-14548, 2003). These reactions occur under relatively mild conditions and afford control over the dimensions of the crystalline-shape particles, but the $TiO_2$ particles obtained are polluted by organic products, rendering them unsuitable for certain applications. The purification of these particles requires, therefore, a prolonged post-treatment calcination process, which, in addition to being costly, could significantly modify the characteristics of the end product, which may not match the requested characteristics.

Examples of methods resulting in $TiO_2$ with uncontrolled shape are the following. R. Parra et al., in Chem. Mat., 20, 143-150, 2008, describe the combined use of organic acids with low molecular weight, such as acetic acid, and 2-propanol as a solvent, in the absence of surfactants, to produce anatase-phase $TiO_2$ from titanium tetraisopropoxide.

The patent application US 20060104894 describes the production of nanocrystals of anatase $TiO_2$ through the reaction of a titanium dioxide precursor and an organic acid, in the presence of an acidic catalyst (e.g. nitric acid) or a basic catalyst, in a solvent including water and alcohols with low molecular weight, heating the resultant solution to 50±15° C.

According to patent application US 20060034752, it is possible, through the reaction of a titanium dioxide precursor, in the presence of an acid (nitric acid, hydrochloric acid, acetic acid or oxalic acid), in water and alcohols with low molecular weight to produce a hydroxide of titanium that, only after calcination, transforms itself into $TiO_2$, but does so with a mixed-phase anatase/brookite composition.

According to the patent application WO 2007028972, it is possible, through the reaction of an alkoxide of titanium in ethanol or acetone and benzyl alcohol in the presence of water or acetic acid, and only after calcination at 400° C., to produce anatase-phase $TiO_2$, which is subsequently transformed into rutile-phase $TiO_2$ through heating to a temperature between 650° and 950° C.

Water and polyols are used in the patent application WO 2006061367 to prepare nanoparticulate $TiO_2$.

Patent application JP 2003267705 describes the production of materials coated with a metal oxide, particularly zinc oxide, where the material to be coated is immersed in the reaction mixture; reference is made to the use of acetic acid, benzyl alcohol and titanium n-butoxide as reactants.

The optimum solution for the low-cost, industrial-scale production of anatase-phase $TiO_2$ particles with nanometric dimensions and controlled shape, which are highly suitable for applications involving photovoltaic cells, particularly DSSC, photoelectrolysis cells and tandem cells for the conversion of solar energy and the production of hydrogen, has yet to become available. There is, then, a need for a process whereby it is possible to produce nanocrystalline, anatase-phase $TiO_2$ particles with controlled shape and high levels of specific surface.

SUMMARY OF THE INVENTION

Surprisingly, we found that the reaction of a titanium dioxide precursor with water a suitable ester and optionally a suitable alcohol, with no need to use surfactants or additional templants, makes possible to produce nanocrystalline $TiO_2$ particles, mainly in anatase form, with controlled dimensions and shape.

The present invention thus relates to a new process for the preparation of nanocrystalline $TiO_2$ particles, mainly in anatase form, with controlled dimensions and shape, through the controlled hydrolysis of a titanium dioxide precursor by means of its reaction in a suitable ester and optionally a suitable alcohol.

In one embodiment, the invention provides a process for the preparation of nanocrystalline $TiO_2$ particles, mainly in anatase form, mainly as nanorods, comprising reacting a titanium dioxide precursor with an ester, neutral or acidic water and optionally an alcohol.

In one embodiment, the invention provides a process for the preparation of nanocrystalline $TiO_2$ particles, mainly in anatase form, mainly as nanocubes, comprising reacting a titanium dioxide precursor with an ester, basic water, and optionally an alcohol.

In another embodiment, the invention provides nanocrystalline particles of $TiO_2$, made by the process according to the present invention, mainly in anatase form, with control over their shape and dimensions, i.e. mainly as nanorods or nanocubes.

In another embodiment, the invention provides the use of the nanocrystalline $TiO_2$ particles, made by the process according to the present invention, as photocatalysts, sensors, semi-conductors, pigments, excipients and colorants.

The invention specifically provides the use of the nanocrystalline $TiO_2$ particles, made by the process according to the present invention, for applications in the fields of photovoltaic cells, preferably DSSC, photoelectrolysis cells and tandem cells for the conversion of solar energy and the production of hydrogen.

The present invention provides a simple, economical method that produces highly replicable results, easily to scale industrially and affords the opportunity to control the morphology and dimensions of nanometric, anatase-phase $TiO_2$ particles in a single step.

The product obtained with the process of the present invention, without recourse to any subsequent treatment, has high anatase content, nanocrystalline-scale particle dimensions and a controlled shape, i.e. nanorods and/or nanocubes. The capacity to obtain $TiO_2$ with high anatase content, nanocrystalline-scale particles and a selective shape in a single step also reduces production overheads. Moreover, the new method of preparation can be carried out in the absence of surfactants, additional templants or other additives, thus reducing the possibility for the occurrence of a number of problems, such as unwanted reactions and presence of organic impurities.

DETAILED DESCRIPTION OF THE INVENTION

Figure 1A:
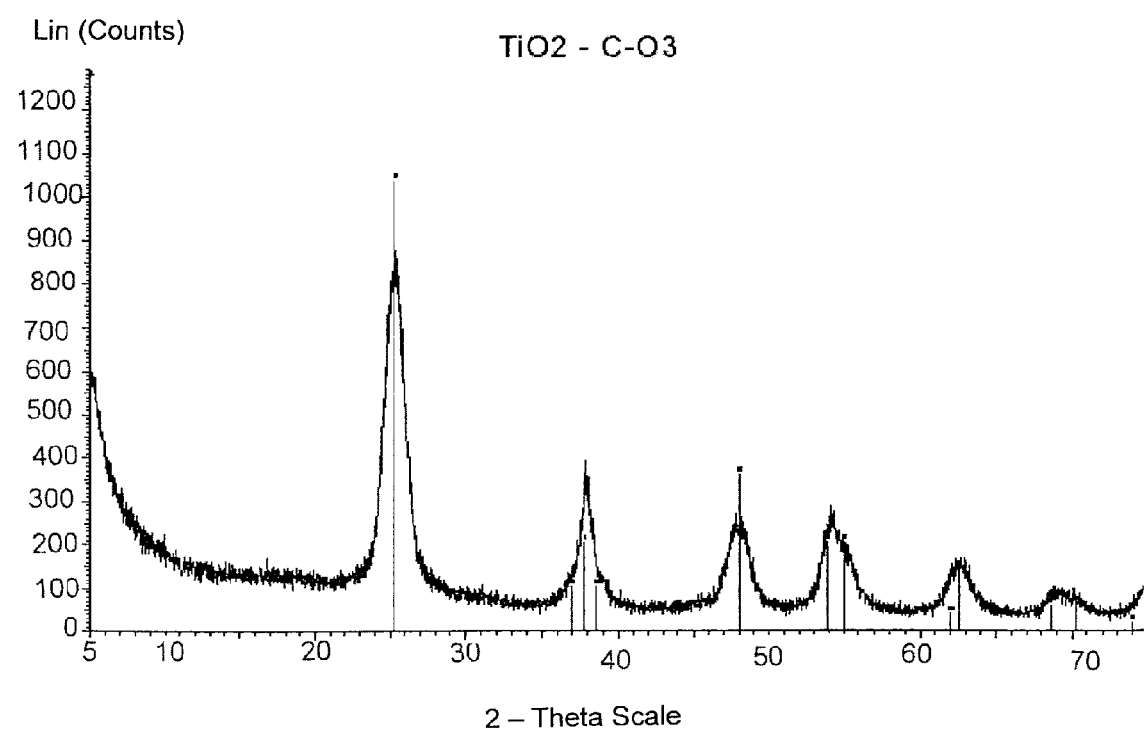
FIG. 1a shown an XRPD of $TiO_2$ powder produced as per Example 1.

Unless otherwise specified, all of the terms used in this application should be interpreted in accordance with their accepted meanings in common technical language. Other, more specific, definitions for certain terms used in the application are highlighted below and are intended to apply both to the description and to the claims.

The terms "titanium dioxide precursor" or "precursor", herein used indifferently, refer to inorganic or organic titanium-containing compounds that that can form $TiO_2$ by means of known reactions, e.g. hydrolysis. Non-limiting examples of titanium dioxide precursor include for instance: titanium alkoxide, titanium halide, such as titanium tetrachloride, titanylsulphate, titanyl bis(acetylacetonate). Preferably, though not exclusively, the precursor is a titanium alkoxide, i.e. a compound $Ti(OR)_4$, wherein R is a $C_1$-$C_6$ alkyl group e.g. titanium tetramethoxide, titanium tetraethoxide, titanium tetra n-propoxide, titanium tetraisopropoxide, titanium tetra n-butoxide and titanium tetra i-butoxide. Particularly preferred is titanium tetraisopropoxide.

The term "ester" or "suitable ester" used herein refers to a $R_2COOR_1$ compound, or to mixtures of different $R_2COOR_1$ compounds, wherein $R_1$ is a linear or branched alkyl; an alicyclic group; an aryl; an aryl substituted by one or more electron donor groups, such as a $C_1$-$C_4$ alkyl or an alkoxyl containing a $C_1$-$C_4$ alkyl radical; an aryl substituted by one or more halogens; an aryl$C_1$-$C_{15}$alkyl, possibly substituted on the aryl ring by one or more electron donor groups, such as a $C_1$-$C_4$ alkyl or an alkoxyl containing a $C_1$-$C_4$ alkyl radical. Preferably, $R_1$ is an alkyl containing between 2 and 12 carbon atoms.

$R_2$ is a linear or branched, saturated or unsaturated alkyl, an aryl or a heteroaryl, said $R_2$ group being substituted by one or more halogen, hydroxyl, alkoxyl, carboxyl, carboalkoxyl, aryl or heteroaryl groups. Preferably said $R_2$ group contains between 1 and 17 carbon atoms. If the $R_2COOR_1$ compound as above defined contains two or more carboxy groups, they are preferably separated from each other by at least 4 carbon atoms. Preferred $R_2COOR_1$ compounds are those derived from a $R_2COOH$ compound chosen among acetic acid, pivalic acid, trifluoroacetic acid, benzoic acid, phenylacetic acid, p-methoxybenzoic acid, 4-pyridylcarboxylic acid, oleic and adipic acid or their mixtures; among them, more preferred are those derived from acetic acid, benzoic acid, oleic acid, adipic acid. Particularly preferred are acetates. The most preferred esters are ethyl acetate, butyl acetate, benzyl acetate, terpinyl acetate.

The term "alcohol" or "suitable alcohol" used herein refers to a $R_1OH$ compound, or to mixtures of $R_1OH$ compounds, wherein $R_1$ is chosen among the meanings given above for the $R_2COOR_1$ compound. Non-limiting examples include: hexan-1-ol, heptan-1-ol, octan-1-ol, 2-ethylhexan-1-ol, nonan-1-ol, decan-1-ol, undecan-1-ol, dodecan-1-ol, terpineol, benzyl alcohol, p-methoxybenzyl alcohol and the like, or their mixtures. Particularly preferred are benzyl alcohol, p-methoxybenzyl alcohol, octan-1-ol or 2-ethyl-hexan-1-ol. The meaning of $R_1$ in $R_1OH$ and in $R_2COOR_1$ may be equal or different; preferably it is equal.

Wherever used in the present application, the term "$C_1$-$C_4$ alkyl" refers to a saturated, linear or branched aliphatic hydrocarbon chain with between 1 and 4 carbon atoms. For example, typical $C_1$-$C_4$ alkyl groups include, methyl, ethyl, n-propyl, iso-propyl, n-butyl, sec-butyl, iso-butyl, tert-butyl and the like.

Wherever used in the present application, the term "$C_1$-$C_6$ alkyl" refers to a saturated, linear or branched aliphatic hydrocarbon chain with between 1 and 6 carbon atoms, preferably between 1 and 4 carbon atoms. Typical alkyl groups include for instance, but are not limited: methyl, ethyl, n-propyl, iso-propyl, n-butyl, sec-butyl, iso-butyl, tert-butyl, n-pentyl, n-hexyl and the like.

Wherever used in the present application, the term "alkoxyl, containing a $C_1$-$C_4$ alkyl radical" refers to ethers containing up to four carbon atoms. Typical alkoxyl groups include for instance, but are not limited: methoxyl, ethoxyl, iso-propoxyl, tert-butoxyl and the like.

Wherever used in the present application, the term "aryl" refers to an aromatic radical with between 6 and 10 carbon atoms, either with a single ring (e.g. phenyl) or with multiple condensed rings (e.g. naphthyl).

Wherever used in the present application, the term "heteroaryl" refers to a heterocyclic aromatic group with one or more heteroatoms in the ring, chosen from O, S or N. Typical heteroaryl groups include for instance, but are not limited: pyridyl, pyrazinyl, pyrimidinyl, pyridazinyl, thienyl, furyl, imidazolyl, pyrrolyl, oxazolyl (e.g. 1,3-oxazolyl and 1,2-oxazolyl), thiazolil (e.g. 1,2-thiazolyl and 1,3-thiazolyl), pyrazolyl, triazolyl (e.g. 1,2,3-triazolyl and 1,2,4-triazolyl), oxadiazolyl (e.g. 1,2,3-oxadiazolyl), thiadiazolyl (e.g. 1,3,4-thiadiazolyl), quinolyl, isoquinolyl, benzothienyl, benzofuryl, indolyl, benzothiazolyl and the like.

The terms "$TiO_2$" and "titanium dioxide" are used indifferently in the present application. The expression "$TiO_2$ mainly in anatase form" indicates that more than 70%, preferably more than 90%, even more preferably more than 95%, most preferably more than 98% by weight of said $TiO_2$ is in the crystalline form of anatase.

The prefix "nano" used herein is referred to particles having generally nanometric dimensions; it refers in particular to particles having length, width, depth comprised between 0.5 and 100 nm, preferably between 0.5 and 50 nm, more preferably between 1 and 20 nm, most preferably between 3 and 15 nm.

The term "nanorods" refers to non-spherical, elongated particles, having a typical rectangular section when observed by TEM, wherein the particle length/width ratio is at least about 3/2. The term "nanocubes" refers to non-spherical particles, having a typical square section when observed by TEM, wherein the particle length/width is about 1/1.

The expression "mainly as nanorod" or "mainly as nanocube" indicates that >50%, preferably >75%, more preferably >80%, most preferably >90% by weight of the $TiO_2$ particles are in the form of nanorods or, respectively, nanocubes.

The nanocrystalline $TiO_2$ particles produced by the invention process, in particular their shapes and dimensions, are characterized using X-Ray Power Diffraction (XRPD) and Transmission Electron Microscopy (TEM).

In one embodiment the present invention provides a method of controlling the shape of nanocrystalline $TiO_2$ particles during their build-up phase. The method according to the invention allows in fact to orient the crystallisation of $TiO_2$ towards the nanorod or nanocube shape, by controlling the pH of the water being used in the process. In particular, the use of neutral or acidic water leads to prevalent formation of nanorods; the use of basic water leads to the prevalent formation of nanocubes. Although the process entails the advantage to obtain particles with a specific shape (nanorods or nanocubes) with a high degree of selectivity (i.e. >90%), the invention is not limited thereto: in fact, also mixtures of these two forms in various proportions, even fair ones, have a valuable photocatalytic activity.

The present process includes the step of adding a suitable amount of water (optionally pH-controlled, as described below) to a initial mixture containing the titanium dioxide precursor, the ester, and optionally the alcohol as above defined; the resulting mixture is then allowed to react, at a suitable temperature, for a time sufficient to allow the conversion of the precursor into $TiO_2$.

The initial mixture is preferably obtained by adding the precursor to the ester (optionally in admixture with the alcohol), followed by homogenisation at a temperature of 30-50°, more preferably 40° C.; the homogenised product is then added with the aforementioned amount of water, preferably kept at a temperature of 30-50°, more preferably 40° C. In a useful embodiment, the whole amount of water is added altogether in one pot (i.e. not step-wise or drop-wise): this mode of addition was found to improve the shape homogeneity of the obtained $TiO_2$ particles.

The $TiO_2$ precursor is preferably present at concentrations of 10-30% by weight, with respect to the overall reaction mixture (ester, water and, when present, alcohol).

When the alcohol is used as co-reagent, the ester/precursor molar ratio should be comprised between 1/1 and 5/1, preferably between 2/1 and 4/1, and most preferably between 2.5/1 and 3.5/1. The alcohol/precursor molar ratio should be comprised between 2/1 and 13/1, preferably between 4/1 and 11/1, and most preferably between 6/1 and 9/1.

When the alcohol is not used as co-reagent, the ester/precursor molar ratio should be comprised between 12/1 and 4/1, preferably between 10/1 and 6/1, and most preferably between 7.5/1 and 9/1.

In order to obtain TiO2 particles mainly in one shape (nanorods or nanocubes), the added water is pH-controlled. In particular, the use of a neutral or acidic water leads to the formation of $TiO_2$ nanorods; the use of basic water leads to the formation of $TiO_2$ nanocubes.

Acidic water is preferably obtained by addition of a mineral acid, e.g. hydrochloric acid, sulfuric acid, phosphoric acid. Preferably the added water is strongly acidic, i.e. its pH is ≤2, more preferably between 0 and 1.

Basic water is preferably obtained by addition of a strong base, e.g. NaOH. Preferably the added water is strongly basic, i.e. its pH is ≥9 more preferably between 12 and 14.

The optionally pH-controlled water is added to the reaction mixture, preferably in molar stoichiometric ratio with respect to the $TiO_2$ precursor (e.g. 4/1 molar ratio when titanium isopropoxide is the precursor).

The thus formed reaction mixture is then heated at reflux temperature, preferably not above 120° C., for a time sufficient to complete the precursor conversion reaction, generally comprised between 12 and 36 hours, e.g. 24 hours.

Upon completion of the reaction, the mixture is suitably cooled, preferably ≤50° C., and mostly preferably 25±15° C.

The working-up of the reacted mixture can be carried out in one of the following ways:
a) centrifugation of the product in order to eliminate the supernatant, rinsing of the solid with appropriate organic solvents and drying in an oven, in case at low pressure;
b) concentration of the reaction mixture at low pressure, dilution of the residue with an appropriate organic solvent, filtration, rinsing of the filtrate with the same solvent and drying in an oven, in case at low pressure;
c) use of spray-drying or turbo-drying directly on the mixture at the end of the reaction or in case as an alternative to the drying phase used in methods a) and b).

Non limiting examples of appropriate organic solvents used in work-up procedures include: alcohols, such as methanol, ethanol, n-propanol, propanol, n-butanol, i-butanol, sec-butanol; aliphatic ketones, such as acetone, methylethylketone, methylbutylketon, cyclohexanone; aliphatic or cycloaliphatic esters, such as tetrahydrofuran, 2-methyltetrahydrofuran, dioxane, diisopropylether, methyl t-butylether, dimethoxyethane, diethoxyethane, diethylenglycol dimethylether, diethylenglycol diethylether, triethylenglycol dimethylether, triethylenglycol diethylether; chlorinated hydrocarbons, such as dichloromethane, trichloroethylene; aliphatic esters, such as methylformate, ethylformate, methylacetate, ethylacetate, butylacetate, isobutylacetate, ethylpropionate; aliphatic or aromatic hydrocarbons, such as pentane and its mixtures, hexane and its mixtures, heptane and its mixtures, ligroine, petroleum ether, toluene, xylene; aliphatic nitriles, such as acetonitrile, propionitrile; or their mixtures in different ratios.

The nanocrystalline $TiO_2$ particles produced using the present invention, i.e. nanorods and/or nanocubes remain stable when stored and are highly useful for a number of applications.

While the present invention has been described in terms of its specific embodiments, certain modifications and equivalents will be apparent to those skilled in the art and are included within the scope of the present invention. In the following, the present invention shall be illustrated by means of some examples, which are not construed to be viewed as limiting the scope of the invention. The following abbreviations are used below: hr (hours); XRPD (X-Ray Power Diffraction); TEM (Transmission Electron Microscopy).

EXPERIMENTAL PART

Example 1

Preparation of TiO2 Nanorods (Ester/Alcohol/Neutral Water)

Figure 1B:
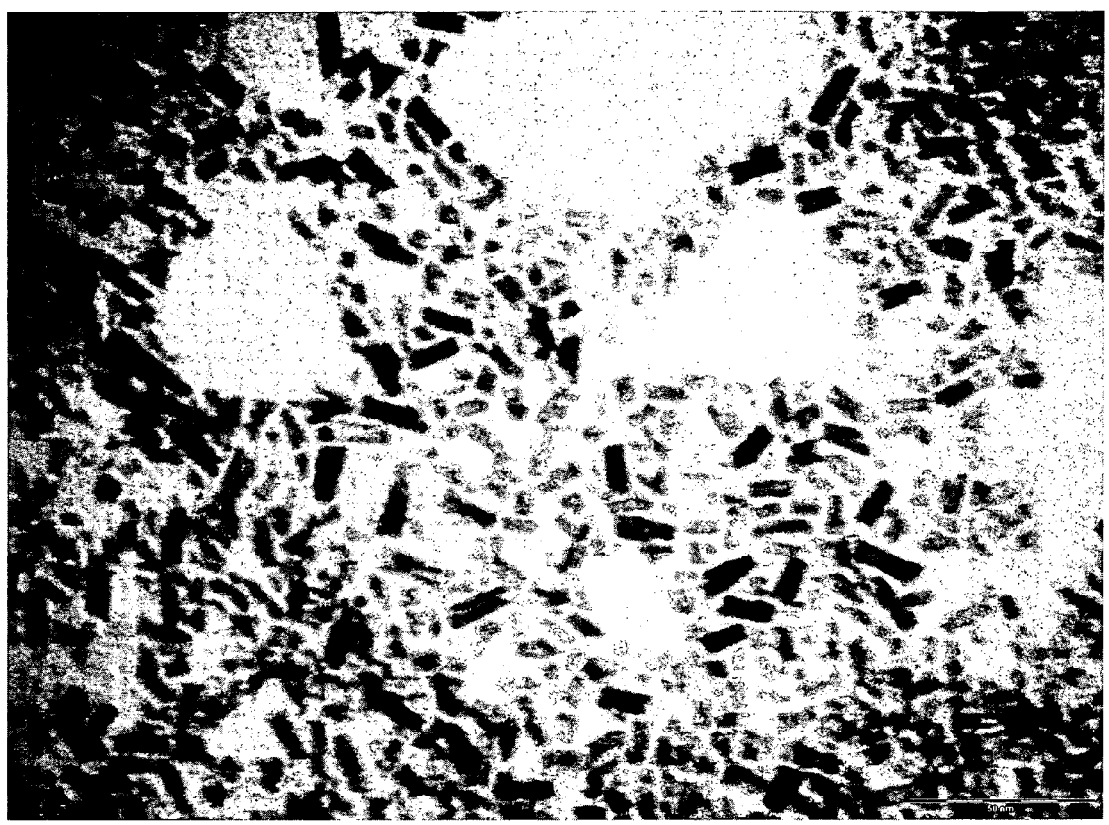
FIG. 1b shows a TEM image of $TiO_2$ produced as per Example 1.

Benzyl alcohol (81.1 g; 0.75 moles), benzyl acetate (43.25 g; 0.29 moles) and titanium tetraisopropoxide [TIP] (28.43 g; 0.10 moles) are added in sequence at room temperature into a 250 mL three-necked flask equipped with heating and cooling systems, and a magnetic stirrer. The TIP addition causes a slightly exothermic reaction, and the reaction mixture heats up to 40° C. Stirring is started, and heating is applied. Upon reaching the temperature of 80° C., 7.2 mL deionised water are added. The mixture is heated to the reflux temperature (about 100° C.). for 24 hours. Then after cooling to room temperature, the reaction mixture is recovered, further subjected to spay drying (Atomization temperature 230° C.; mixture feeding rate 250 mL/h; drying nitrogen feeding rate: 670 L/h; sucking rate 90 m³/h) and finally calcinated at 400° C. for 5 min., The $TiO_2$ product thus obtained, having BET surface area 60 m²/g is characterized by XRPD (FIG. 1a) and TEM (FIG. 1b). The selective formation of nanorods is clearly visible. The crystalline parameters of the product are as follows.

| Sample | wt % anatase | Average crystallite size anatase (nm) | Crystallite size anatase along [001] (nm) | anatase aspect ratio | wt % brookite |
| --- | --- | --- | --- | --- | --- |
| C—O3 normal | 100.00 | 4.61 | 8.12 | 1.8 | — |

Example 2

Preparation of TiO2 Nanorods (Ester/Alcohol/Acidic Water)

Figure 2A:
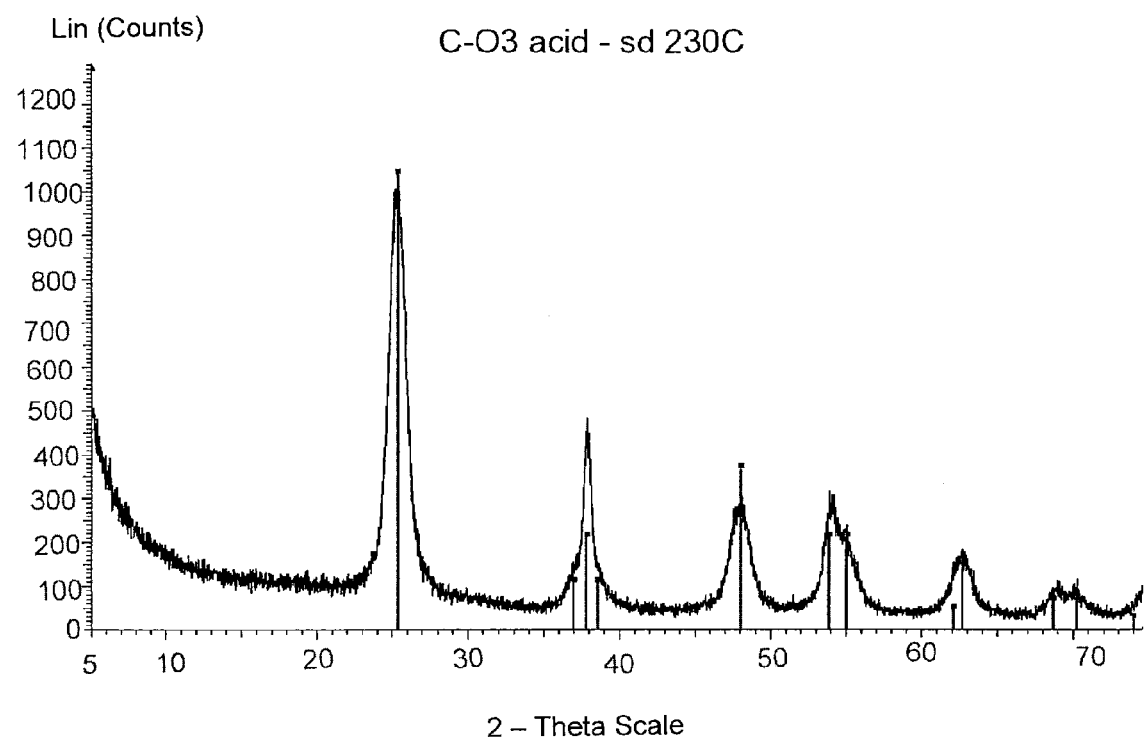
FIG. 2a shows an XRPD of $TiO_2$ powder produced as per Example 2.
Figure 2B:
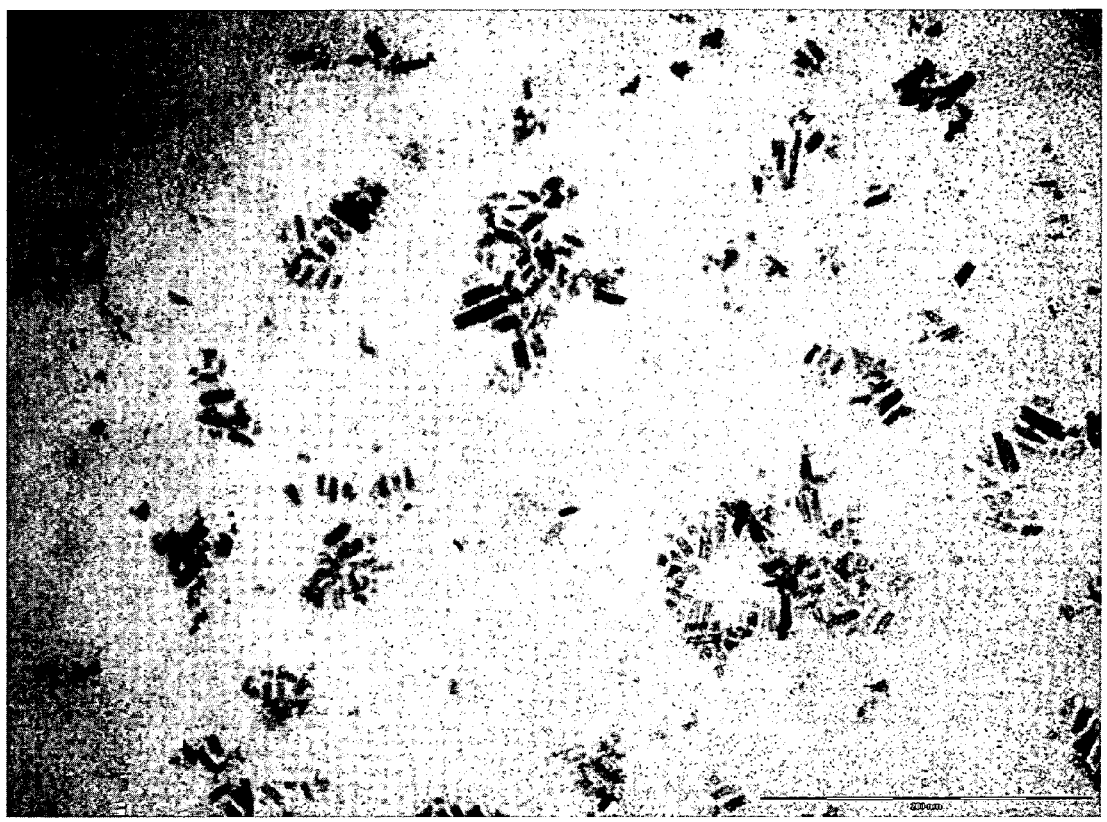
FIG. 2b shows a TEM image of $TiO_2$ produced as per Example 2.

Benzyl alcohol (81.1 g; 0.75 moles), benzyl acetate (43.25 g; 0.29 moles) and titanium tetraisopropoxide [TIP] (28.43 g; 0.10 moles) are added in sequence at room temperature into a 250 mL three-necked flask equipped with heating and cooling systems, and a magnetic stirrer. The TIP addition causes a slightly exothermic reaction, and the reaction mixture heats up to 40° C. 7.2 mL of HCl 1M are then added at once. The mixture is heated to the reflux temperature (about 100° C.). for 24 hours. After cooling to room temperature, the reaction mixture is recovered, further subjected to spay drying (Atomization temperature 230° C.; mixture feeding rate 250 mL/h; drying nitrogen feeding rate: 670 L/h; sucking rate 90 m³/h) and finally calcinated at 450° C. for 30 min. The $TiO_2$ product thus obtained, having BET surface area 114.8 m²/g is characterized by XRPD (FIG. 2a) and TEM (FIG. 2b). The selective formation of nanorods is clearly visible. The crystalline parameters of the product are as follows.

| Sample | wt % anatase | Average crystallite size anatase (nm) | Crystallite size anatase along [001] (nm) | anatase aspect ratio | t % brookite |
|---|---|---|---|---|---|
| C—O3 acid | 100.00 | 5.08 | 8.70 | 1.7 | — |

Example 3

Preparation of TiO2 Nanorods (Ester/Acidic Water)

Figure 3A:
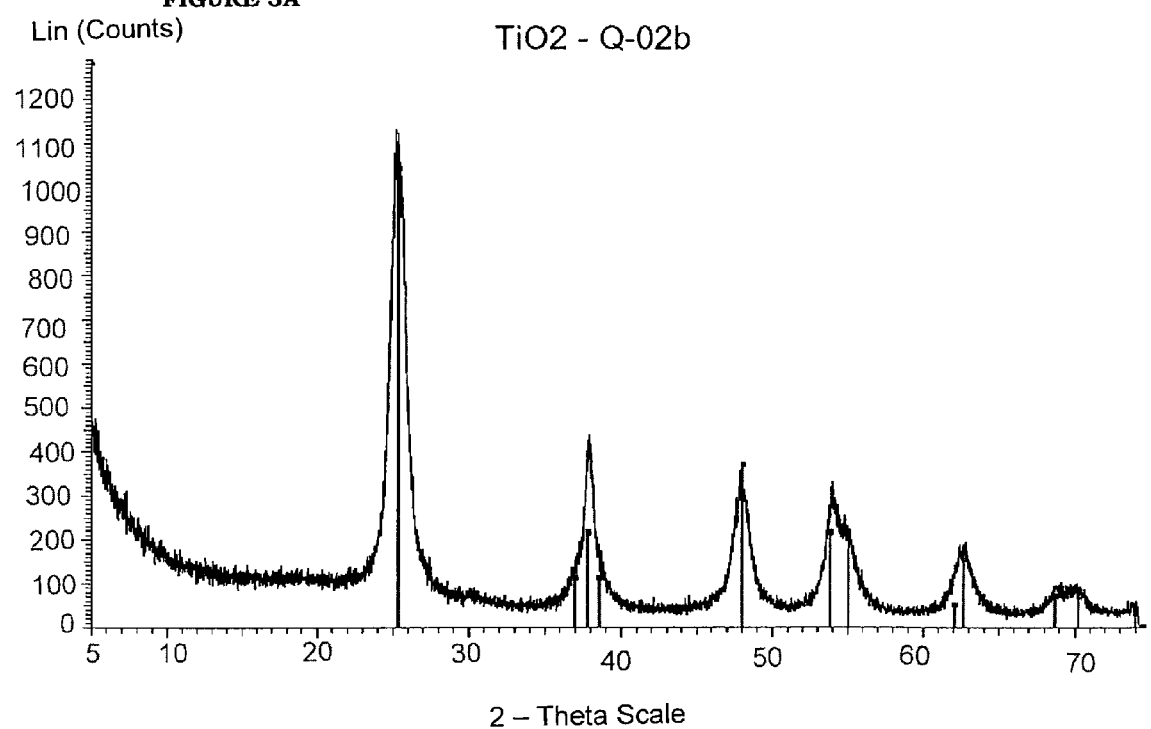
FIG. 3a shows an XRPD of $TiO_2$ powder produced as per Example 3.
Figure 3B:
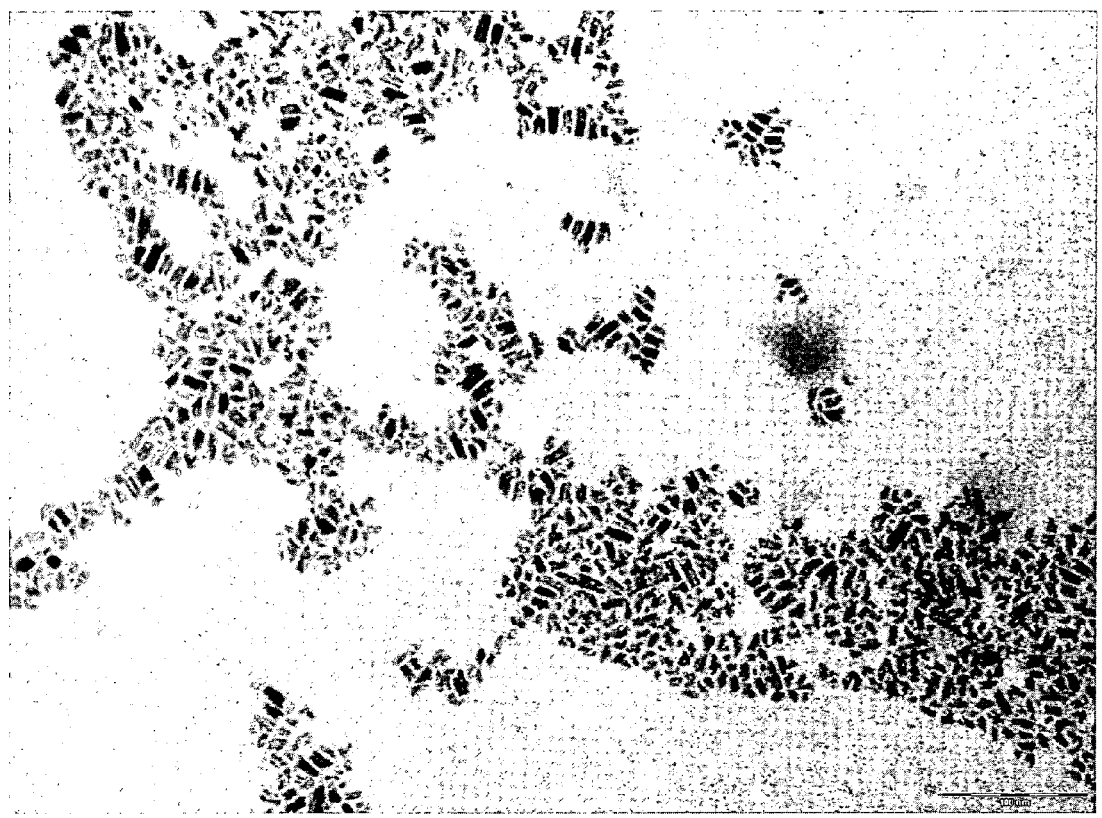
FIG. 3b shows a TEM image of $TiO_2$ produced as per Example 3.

Benzyl acetate (123 g; 0.82 moles) and titanium tetraisopropoxide [TIP] (28.43 g; 0.10 moles) are added in sequence at room temperature into a 250 mL three-necked flask equipped with heating and cooling systems, and a magnetic stirrer. The TIP addition causes a slightly exothermic reaction, and the reaction mixture heats up to 40° C. 7.2 mL HCl 1M are then added at once. The mixture is heated to the reflux temperature (109° C.) (vertex at 115° C.) and kept under stirring for 24 hours. After cooling to room temperature, the reaction mixture is recovered, further subjected to spay drying (Atomization temperature 245° C.; mixture feeding rate 250 mL/h; drying nitrogen feeding rate: 670 L/h; sucking rate 90 m$^3$/h) and finally calcinated at 450° C. for 30 min. The TiO$_2$ product thus obtained, having BET surface area 123.4 m$^2$/g is characterized by XRPD (FIG. 3$a$) and TEM (FIG. 3$b$). The selective formation of nanorods is clearly visible.

Example 4

Preparation of TiO2 Nanocubes (Ester/Basic Water)

Figure 4A:
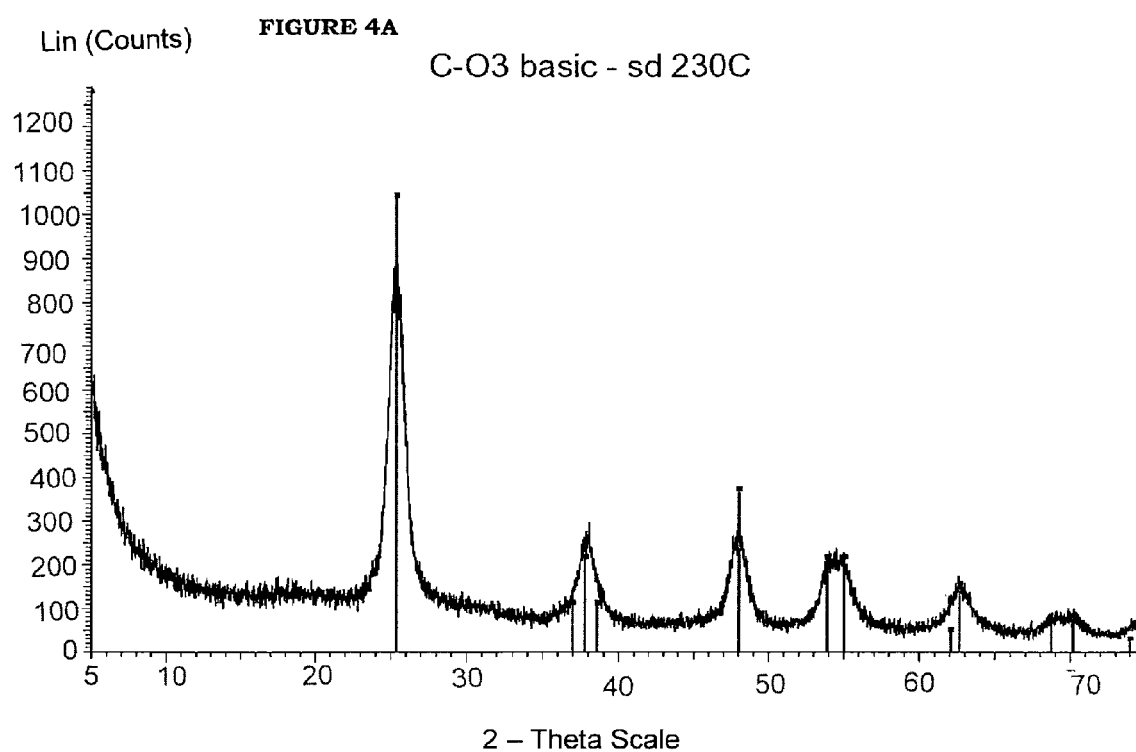
FIG. 4a shows an XRPD of $TiO_2$ powder produced as per Example 4.
Figure 4B:
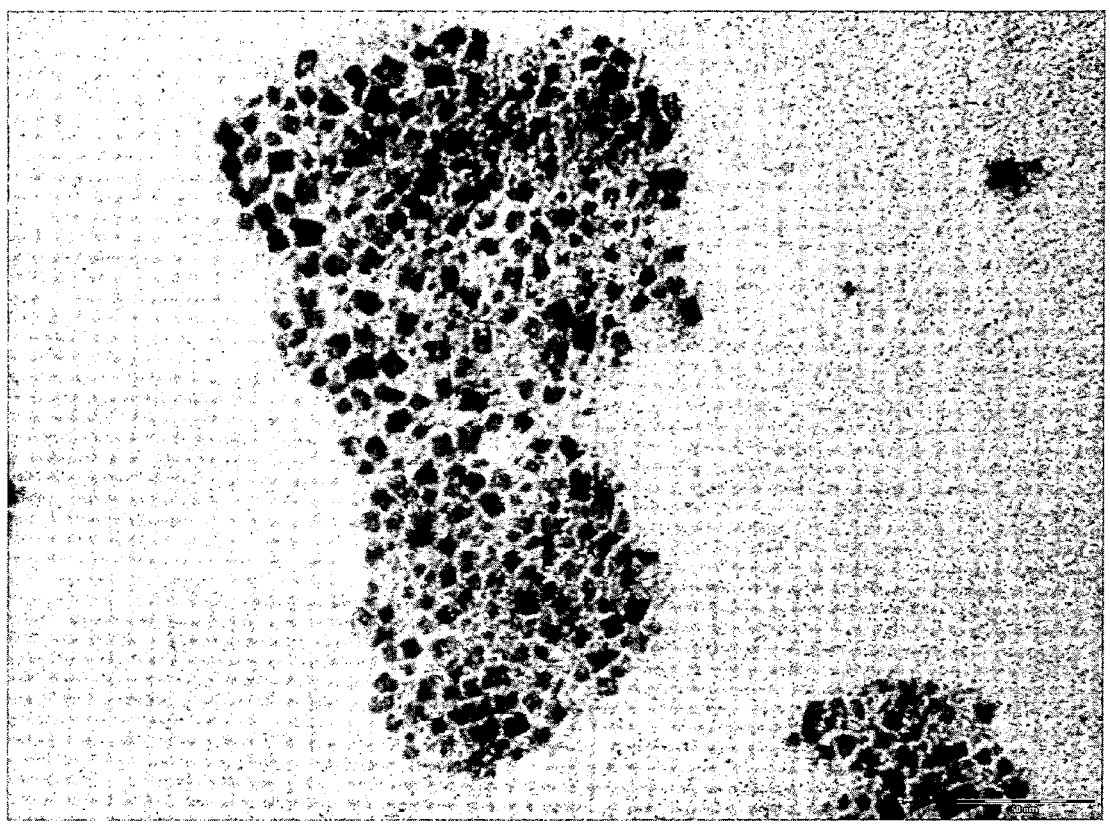
FIG. 4b shows a TEM image of $TiO_2$ produced as per Example 4.

Benzyl alcohol (81.1 g; 0.75 mol), benzyl acetate (43.25 g; 0.29 moles) and titanium tetraisopropoxide [TIP] (28.43 g; 0.10 moles) are added in sequence at room temperature into a 250 mL three-necked flask equipped with heating and cooling systems, and a magnetic stirrer. The TIP addition causes a slightly exothermic reaction, and the reaction mixture heats up to 40° C. 7.2 mL NaOH 1 M are then added at once. The mixture is heated to the reflux temperature (90-100° C. ° C.) for 24 hours. After cooling to room temperature, the reaction mixture is recovered, further subjected to spay drying (Atomization temperature 230° C.; mixture feeding rate 250 mL/h; drying nitrogen feeding rate: 670 L/h; sucking rate 90 m$^3$/h) and finally calcinated at 450° C. for 30 min. The TiO$_2$ product thus obtained, having BET surface area 89.1 m$^2$/g is characterized by XRPD (FIG. 4$a$) and TEM (FIG. 4$b$). The selective formation of nanocubes is clearly visible.

The invention claimed is:

1. Process for the preparation of controlled-shape nanocrystalline TiO$_2$ particles, mainly in anatase form, wherein at least 50% by weight of said TiO$_2$ particles have nanorod shape, comprising the reaction of a titanium dioxide precursor with an ester, water and optionally an alcohol, wherein said ester and precursor are used in a ratio between 1/1 and 5/1 in presence of said alcohol, or between 12/1 and 4/1 in absence of said alcohol, and wherein the water has a pH ranging from 0 to 7.

2. Process according to claim 1, wherein ≥95% of said nanocrystalline TiO$_2$ particles are in anatase form.

3. Process according to claim 1, wherein the nanorod-shaped particles, observed under TEM microscopy, display substantially rectangular section, with a length/width ratio of at least about 3/2, and the nanocube-shaped particles display substantially square section, with a length/width ratio of about 1/1.

4. Process according to claim 1, wherein the precursor is a titanium alkoxide; the ester is chosen among esters of acetic acid, pivalic acid, trifluoroacetic acid, benzoic acid, phenylacetic acid, p-methoxybenzoic acid, 4-pyridylcarboxylic acid, oleic acid, adipic acid or mixtures thereof; the alcohol, when present, contains from 2 to 12 carbon atoms.

5. Process according to claim 4, wherein the precursor is titanium tetraisopropoxide, the ester is (a) butyl acetate, where butyl is linear or branched, or (b) benzyl acetate, and the alcohol, when present, is benzyl alcohol.

6. Process according to claim 1, wherein said ester and the precursor are used in a ratio of between 2/1 and 4/1 in presence of said alcohol, or between 10/1 and 6/1 in absence of said alcohol.

7. Process according to claim 1, wherein said ester and the precursor are used in a ratio between 2.5/1 and 3.5/1 in presence of said alcohol, or between 7.5/1 and 9/1 in absence of said alcohol.

8. Process according to claim 1, wherein the water is added in stoichiometric amount with respect to the precursor.

9. Process according to claim 1, where the water has a pH ranging from 0 to 2.

10. Process for the preparation of controlled-shape nanocrystalline TiO$_2$ particles, mainly in anatase form, wherein at least 50% by weight of said TiO$_2$ particles have nanorod shape, comprising reacting a titanium dioxide precursor with an ester, water and optionally an alcohol, and wherein the water has a pH higher than 7.

11. Process according to claim 10, where the water has a pH ranging from 12 to 14.

* * * * *